United States Patent [19]

Farrow

[11] Patent Number: 4,851,635

[45] Date of Patent: Jul. 25, 1989

[54] METHOD AND APPARATUS FOR DETERMINING THE POWER FACTOR OF A CIRCUIT

[75] Inventor: John F. Farrow, Plymouth, Mich.

[73] Assignee: Medar, Inc., Farmington Hills, Mich.

[21] Appl. No.: 219,612

[22] Filed: Jul. 14, 1988

Related U.S. Application Data

[63] Continuation of Ser. No. 387,704, Jun. 11, 1982, abandoned.

[51] Int. Cl.[4] ............................................. B23K 11/24
[52] U.S. Cl. .................................. 219/110; 219/114; 323/246; 324/83 D
[58] Field of Search ...................... 219/108, 110, 114; 323/246; 324/83 R, 83 D

[56] References Cited

U.S. PATENT DOCUMENTS

| | | | |
|---|---|---|---|
| 2,961,596 | 11/1960 | Rockafellow | 323/246 |
| 4,104,724 | 8/1978 | Dix et al. | 219/108 |
| 4,254,466 | 3/1981 | Jurek | 219/110 |
| 4,271,387 | 6/1981 | Mukai et al. | 323/246 |
| 4,289,948 | 9/1981 | Jurek et al. | 219/110 |
| 4,289,951 | 9/1981 | Jurek | 219/114 |
| 4,321,529 | 3/1982 | Simmonds et al. | 324/83 R |
| 4,343,980 | 8/1982 | Stanya et al. | 219/110 |

Primary Examiner—Clifford C. Shaw
Attorney, Agent, or Firm—Dykema Gossett

[57] ABSTRACT

Structure for and method of controlling the firing point of thyristors in a phase controlled contactor in a resistance welding circuit in accordance with variations in current line voltage and/or one of resistance and inductive impedance in the welding circuit including structure for and the method of determining the firing point in a cycle of alternating electrical energy fed to the welder in terms of its distance from zero voltage cross over point and determining the current lag after a subsequent zero voltage cross over point of the voltage signal, determining the power factor of the welding circuit from these angular measurements and selecting a new firing delay for the contactor in accordance with the circuit power factor and the percent heat selected in the welding circuit, and subsequently correcting the firing delay in accordance with the percent heat selected in view of changes in the line voltage and circuit current.

31 Claims, 4 Drawing Sheets

$V = E_m(\sin(\omega t + \lambda))$

METHOD AND APPARATUS FOR DETERMINING THE POWER FACTOR OF A CIRCUIT

RELATED APPLICATIONS

This application is a continuation of co-pending U.S. patent application Ser. No. 387,704 filed June 11, 1982 now abandoned.

BACKGROUND OF THE INVENTION

1. Field of the Invention

The invention relates to controls and refers more specifically to structure for and a method of selecting firing points for silicon controlled rectifiers in a contactor of a phase control, current, voltage or power controlling circuit in accordance with variations in line voltage and the circuit power factor as determined by circuit resistance and impedance, specifically inductive impedance.

2. Description of the Prior Art

Electronic controls have been utilized for example in resistance welders to provide phase control firing of thyristors, either silicon controlled rectifiers or ignitron tubes, in contactor structure in the primary circuit of a welding transformer to control the amount of welding current in the secondary circuit. The purpose of controlling the firing point of the thyristors of the contactor has been to control the current to a weld to provide a known and stable energy flow for heating the metal to a desired temperature. It is desirable to apply energy to a weld at a rate neither too high nor too low, in order to secure a good weld. It is further desirable to keep the energy rate from changing due to external influences, such as power line voltage fluctuation and power factor fluctuation of the welding circuit itself.

With prior resistance welding circuit control structure, it has not been possible to adequately correct for line voltage fluctuations and power factor fluctuations so that undesirable welds were often produced, resulting in an undesirable percentage of industrial scrap.

SUMMARY OF THE INVENTION

In accordance with the invention, a control is provided, for use, for example, but not for limitation in a welding structure by which the firing angle of thyristors in a contactor in the primary circuit of resistance welding structure is controlled, taking into account variations in line voltage and/or welding circuit resistance and/or current and/or impedance so that the amount and rate of energy applied to the work is accurately controlled to some desired value or set of values.

The structure of the invention includes means for controlling the time between the zero crossover voltage points of an alternating electrical signal fed to the welding transformer primary and the time of turn-on of the thyristors of the contactor in the primary circuit, and for measuring the time from this turn-on point until the following zero current point and for providing an indication of circuit power factor from such time parameters and selecting a firing angle for the contactor on the next half cycle of the input electric signal in accordance with the measured power factor and percent heat or primary circuit current selected by the user in the welding circuit.

The structure further includes means for sensing the power line voltage and/or primary circuit current and for correcting for line voltage variations in accordance with the measured power factor of the primary circuit and the user entered, desired percent heat or primary circuit current by varying the conduction angle of the thyristors.

The method of the invention includes sensing the power factor in the primary circuit of, for example, but not limiting, resistance welding structure and varying the firing point of contactor structure in the primary circuit of the resistance welding structure in accordance with the sensed power factor and a selected percent heat and/or primary circuit current desired and sensing the line voltage and primary circuit current fed to the resistance welding structure, and varying the firing point of the contactor structure in accordance with the sensed line voltage and/or primary circuit current and a selected percent heat or desired primary current.

DESCRIPTION OF THE PREFERRED EMBODIMENTS

Figure 1:
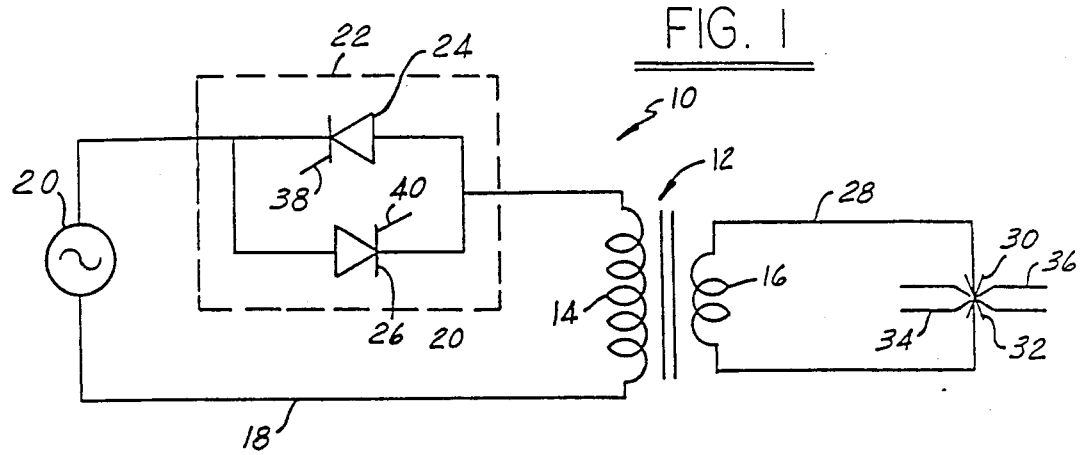
FIG. 1 is a schematic diagram of resistance welding structure to which the welding control structure of the invention for practicing the method of the invention may be connected.

As shown best in FIG. 1, the usual resistance welding structure 10 includes a welding transformer 12 having a primary winding 14 and a secondary winding 16.

The primary winding 14 is connected through a primary circuit 18 to a source of alternating electrical energy 20 through contactor structure 22. The contactor structure 22 includes thyristors 24 and 26, which are either ignitron tubes or silicon controlled rectifiers, connected in inverse parallel in the primary circuit 18, as shown in FIG. 1.

The secondary winding 16 of the transformer 12 is connected in the secondary circuit 28 of the resistance welding structure 10 to provide high current, low voltage signals across welding electrodes 30 and 32 to provide the heating required for a resistance weld of the workpiece members 34 and 36.

In such resistance welding structure, it is usual practice to include an electronic welding control to provide a firing point signal on the gate electrodes 38 and 40 of the thyristors 24 and 26 to permit control of the energy provided at the workpieces 34 and 36 by means of varying the timing of turn on pulses in relation to the applied power line voltage so that different conduction angles are achieved. It is further usual practice to include on the electronic welding control a user settable adjustment so that desired rate of energy applied to the weld may be selected. The adjustments are usually labeled "percent heat" or "primary current" and are calibrated in percent or amperes.

100% heat in resistance welding structures such as shown in FIG. 1 corresponds to the energy rate that would be applied to the weld if the primary of the welding transformer was connected directly to the incoming power line. This energy rate is a function of the impedances of the welding transformer and the welding circuit, and the weld itself, as well as the voltage of the incoming power line. By using phase control, that is, synchronous switching, of the contactor, a welding control, in response to a particular setting of percent heat adjustment, reduces the energy flow at the weld to the desired percentage of the maximum available.

In order to effect a reduction of welding power to the desired percent of maximum power, a welding control must take into account the apparent power factor that appears at the primary of the welding transformer.

Figure 2:
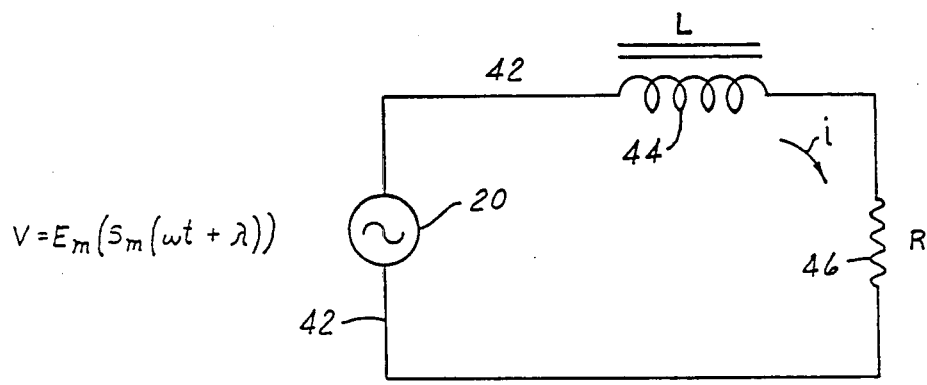
FIG. 2 is an equivalent circuit of the welding circuit of the resistance welding structure illustrated in FIG. 1 as it appears in the primary circuit of the transformer.

Since the nature of high current resistance welder structure 12 is always inductive, it always has a lagging power factor. Thus, looking into the primary circuit of an operating resistance welding transformer, with its secondary load, the equivalent circuit 42 includes inductance 44 and resistance 46 in series with the source of alternating electrical energy 20, all as shown in FIG. 2.

The resistance 46 is the effective sum of all the resistance in the circuits 18 and 28 including the resistance of the material to be welded. The inductance 44 is the effective sum of all the inductances in the circuits. The power factor of the circuit 42 is a function of both the resistance 46 and the inductance 44. The equation (1) for the power factor for this equivalent circuit is:

$$PF = \frac{R}{\sqrt{Z_L^2 + R^2}} \text{ and } 0 \leq PF \leq 1 \quad (1)$$

where:
PF equals the power factor of circuit 42.
R equals resistance 46.
$Z_L$ is the reactance of the inductance 44 at a particular frequency, which in the case of a 60 Hz power line is 60 Hz.

The effective reactance of the inductance 44 increases greatly as the incoming power wave form is phase controlled to control current, that is, as the firing point of the thyristors 24 and 26 is varied. This change in the effective reactance is due to the fact that as a 60 Hz wave form is chopped up, phase controlled harmonics are generated.

Thus, as the firing points of the contactor are retarded, the energy content of the harmonics of the wave form applied to the welding transformer primary increases as a portion of the total energy applied, while total energy applied decreases. The effect of this is to increase the reactance of the inductance in the welding circuit, because the inductance presents a higher impedance to higher frequency signals.

Therefore, the relationship between firing angles of the thyristors and energy delivered to the resistive portion of the circuit of FIG. 2 is quite different for different ratios of R and L (i.e. different power factors) in the circuit in FIG. 2. If, however, the welding control is to be able to correct for variations in power line voltage, the ratio of R and L must be known so that the relationship between firing angle and relative energy delivered to the resistive portion of the circuit of FIG. 2 can be determined and used to correct for power line voltage changes.

Figure 3:
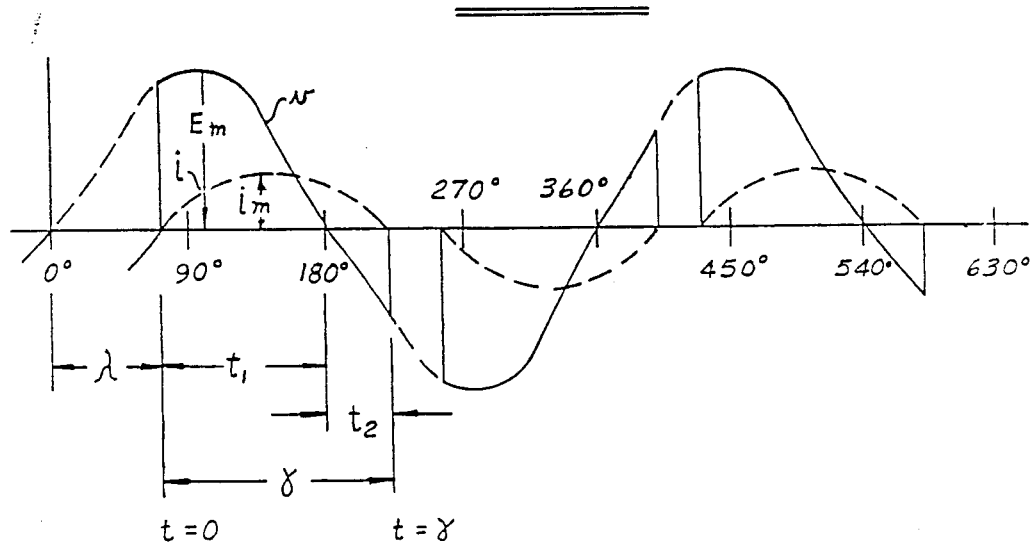
FIG. 3 is a diagrammatic representation of the alternating voltage and current signals in the primary circuit of the resistance welding structure illustrated in FIG. 1.
Figure 4:
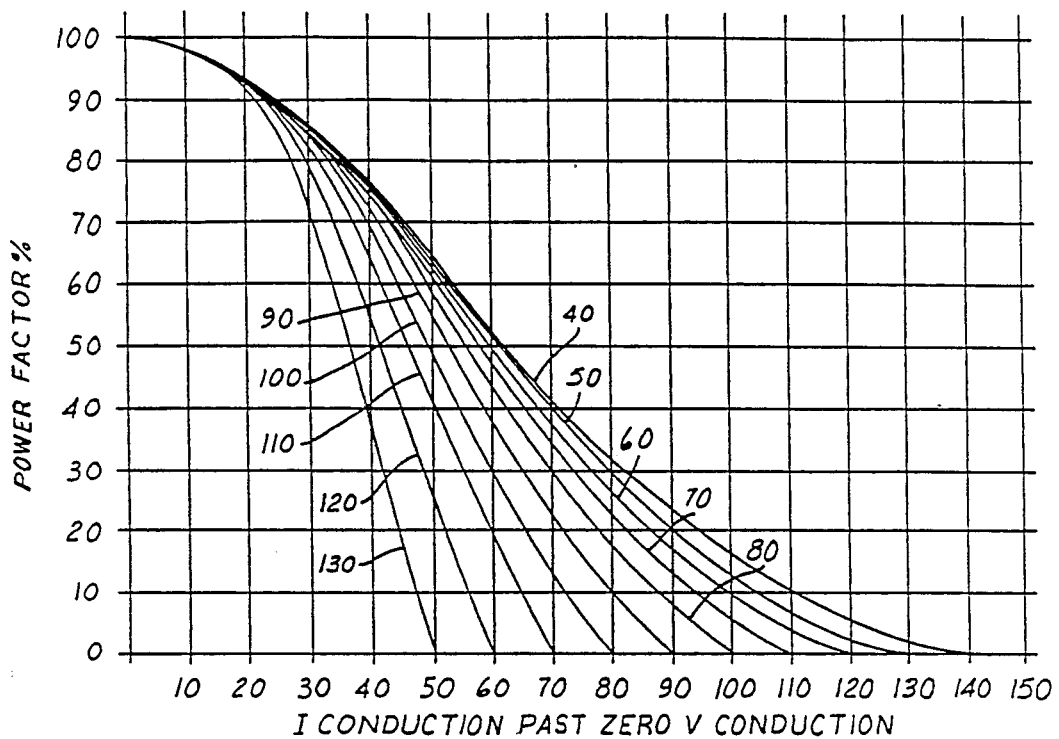
FIG. 4 is a graphic representation of the relationship between power factor, current conduction after zero voltage crossover and firing angle delay in the resistance welding circuit of FIG. 1.
Figure 5:
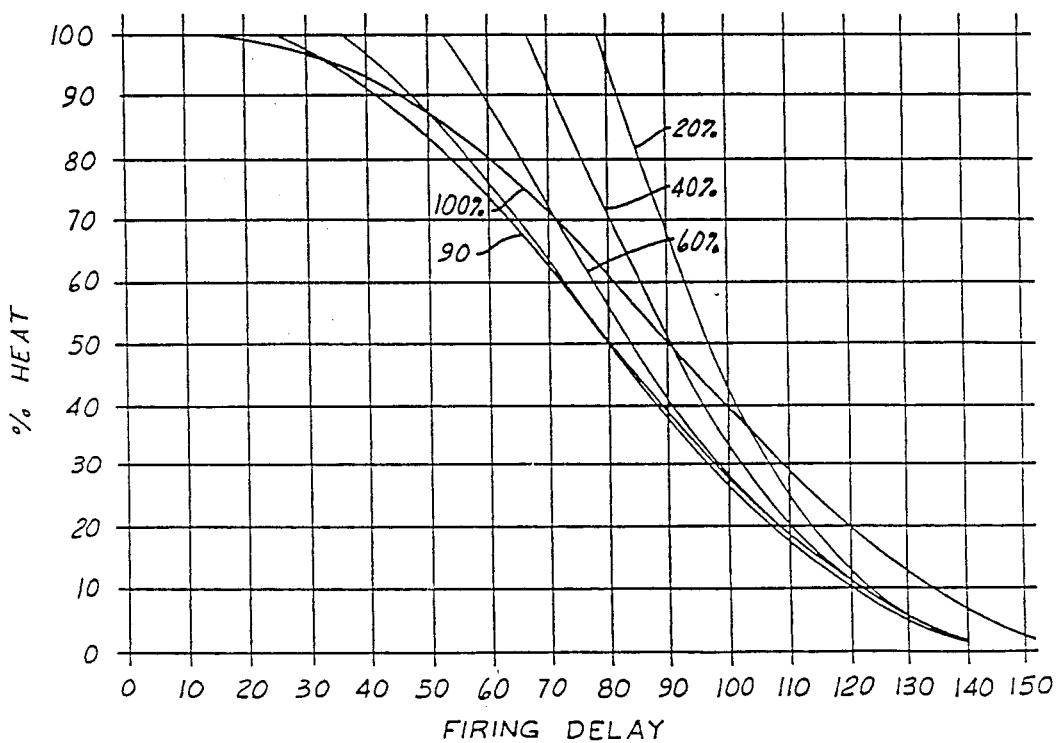
FIG. 5 is a graphic representation of the relationship between percent heat selected, firing angle delay and selected power factor in the resistance welding circuit of FIG. 1.

The ratio of R and L can be determined by measuring two time intervals shown in FIG. 3. In FIG. 3, $t_1$ is the time interval between the turn-on time of the thyristors and the applied power line voltage zero crossing. The amount of time the current flows past the following power line voltage zero crossing is designated $t_2$ in FIG. 3.

For a given time, $t_1$, there is a definite relationship between $t_2$ and the ratios of R and L in the circuit of FIG. 2. Stated another way, if $t_1$ and $t_2$ are known, then the power factor of the welding structure (the ratio of R to L in FIG. 2) can be found, because of the definite relationship between $t_1$, the power factor of the circuit and $t_2$.

Once the power factor of the circuit is known, then the relationship between relative energy delivered to the resistive portion of the circuit and the firing angle of the thyristors can be determined. This relationship is used for two purposes. First, it allows the control to accurately set the firing angle of the thyristors in response to a user entered percent heat setting. Second, if the power line voltage changes during weld time, the control can compute the exact amount that the firing angle of the thyristors needs to be moved in order to keep the energy delivered to the resistive portion of the circuit, which includes the weld, constant in spite of the power line voltage change.

The following is a mathematical explanation of what the control does, followed by a hardware description.

Consider the circuit of FIG. 2 and assume it includes the contactor structure 22 of FIG. 1 between the source of energy 20 and the inductance 44. The contactor structure 22 is shown as a pair of SCR's for convenience but it could as well be constructed utilizing a pair of ignitron tubes, a triac, or other similar devices.

The inductance, L, represents the apparent inductance that appears in the primary circuit of a resistance welding transformer mostly due to the inductance of the secondary loop of the welder. The remaining part of the inductance is due to the characteristics of the transformer itself.

The resistance R represents the effective resistance of all the resistive components in the welding circuit, including the resistance of the weld itself.

The following analysis considers the events of a single, positive, polarity half-cycle of the input power on the power line. A list and explanations of the terms used in the equations in the analysis follows. It is assumed that the voltage drop on the thristors is negligible.

i = Instantaneous current through the circuit.
$I_m$ = Maximum instantaneous value of current in the circuit.
ω = The angular velocity of the applied sinusoidal AC power line voltage = 2πF (F = 60 Hz in US).
θ = The natural power factor angle =

$$\tan^{-1} \frac{\omega L}{R}$$

L = The inductance of the circuit.
R = The resistance of the circuit.

λ = Firing angle, that is, the point in terms of degrees or radians past the zero-crossing point where the contactor is triggered on.

t = Time, measured in seconds. t=0 is the time when the contactor is triggered on.

v = The instantaneous value of the applied power line voltage, defined as v=$E_m$ (sin (ωt+λ)).

$E_m$ = The maximum instantaneous value of the applied power line voltage.

β = (λ−θ).

γ = Time at which current is zero after t=0 (conduction angle).

e = Base of natural logarithms.

The equation for the voltage in the circuit of FIG. 2 is expressed in the form:

$$E_m \sin(\omega t + \lambda) = L\frac{di}{dt} + iR \text{ where } 0 < t \leq \gamma \quad (1)$$

$$\frac{Ldi}{dt} = \text{voltage across } L$$

$$iR = \text{voltage across } R$$

or $$\frac{E_m}{L}\sin(\omega t + \lambda) = \frac{di}{dt} + \frac{R}{L}i$$

Equation (1) must be integrated to get rid of the di/dt term. Fortunately it is of the form of dy/dx+Py=Q where P and Q are functions of X.

The solution of this equation form is:

$$\int \frac{Pdx}{ye} = Q \int \frac{Pdx}{e} dx.$$

Substituting y=i, P=R/L, dx=dt and $$Q = \frac{E_m}{L}\sin(\omega t + \lambda) \quad )$$

from equation (1) yields:

$$i\int e^{\frac{R}{L}dt} = \frac{E_m}{L}\sin(\omega t + \lambda) \int e^{\frac{R}{L}dt} dt + C_1 \quad (2)$$

where $C_1$ is a constant related to boundry conditions.

Carrying out the integrations on both sides and simplyfying yields:

$$ie^{\frac{Rt}{L}} = \frac{E_m}{\sqrt{R^2 + (\omega L)^2}}\sin(\omega t + \lambda - \theta) + C_1 \quad (3)$$

This equation (3) is valid only for 0≤t≤γ.

A simplification of equation (3) is possible using the following identity:

$$\frac{E_m}{\sqrt{R^2 + (L)^2}} = \frac{E_m}{z} = I_m$$

so the equation becomes:

$$ie^{\frac{Rt}{L}} = I_m e^{\frac{Rt}{L}} \sin(\omega t + \lambda - \theta) + C_1 \quad (4)$$

In order to evaluate equation (4) a further simplification can be made by realizing that at t=0, i=0. So at t=0 equation (4) becomes:

$$\frac{O}{O} = I_m \cdot \sin(\lambda - \theta) + C_1 \quad (5)$$

Substituting equation (5) into equation (4) gets rid of $C_1$ and yields the result:

$$i = I_m(\sin(\omega t + \lambda - \theta) - \sin(\lambda - \theta)e^{-\frac{RT}{L}}) \quad (6)$$

using the identity $$\theta = \tan^{-1}\frac{\omega L}{R}, \frac{R}{L} = \omega \cot \theta$$

puts all the ratios of R and L in equation (6) in terms of θ, the natural power factor angle. This change simplifies some of the following discussions.

With this change, equation (6) becomes:

$$i = I_m(\sin(\omega t + \lambda - \theta) - \sin(\lambda - \theta)e^{-\omega t \cot \theta}) \quad (7)$$

Equation (7) is valid if functions outside limits 0≤t≤γ are discounted.

This equation allows θ, the natural power factor angle to be computed if γ, the time after t=0, that i=0, and λ, the firing angle (see FIG. 3) are known.

In practice, it is quite easy to determine γ and λ. The firing angle λ is a parameter that may be very accurately controlled. The value of γ may be easily determined by using a timer to measure the time interval between t=0 and the time when i=0. Once λ and γ are known, γ is substituted for t and the equation is solved for θ. Once θ is known, the power factor may be computed by the identity PF=cos θ and the ratio R/L may be computed by the identity R/L=ω cot θ.

Equation (7) is the basic equation used to compute power factor given firing angle λ and the time γ when i=0 after firing.

Equation (7) in integrated form is also used to determine the relationship between percent heat and firing angle, or put in a mathematical way, the relationship $$\left(\frac{I_{RMS}}{I_{RMS(max)}}\right)^2,$$

since percent heat, the proportion of available energy delivered to the resistive part of the circuit is a function of RMS current squared.

The RMS current during a single half-cycle in the circuit of FIG. 2 is given by the equation:

$$I_{RMS} = \sqrt{\int_{t_1}^{t_2} \frac{i^2 dt}{t_a}}$$

where:

$t_1$ = time of firing (same as t=0 in FIG. 3)
$t_2$ = (time where i=0 after t=0)

$t_a$ = averaging time = period of half-cycle

Converting from time units to units of angular displacement for convenience in calculation:

$$I_{RMS} = \sqrt{\int_{\omega t_1}^{\omega t_2} \frac{i^2 \, dt}{wta}} \qquad (8)$$

Using radians to simplify calculations, $\omega ta$ becomes $\pi$, the duration in radians of ½ cycle.

Substituting equation (7) for i in equation (8) and setting the integration limits to appropriate values (0 and $\gamma$), the result becomes:

$$I_{RMS} = \sqrt{\int_0^\gamma \frac{i^2 \, dt}{\pi}} \qquad (9)$$

$$I_{RMS} = \sqrt{\frac{i^2 m}{\pi} \int_0^\gamma (\sin(\omega t + \lambda - \theta) - \sin(\lambda - \theta) e^{-\omega t \cot\theta})^2 \, d(\omega t)}$$

In order to form the ratio $$\frac{I_{RMS}}{I_{RMS\,(max)}}$$

it should be recognized $I_{RMS\,(max)}$ occurs when the contactor is on all the time (mathematically $t_o = \gamma = 0$) and all waveforms are sinusoidal, like the incoming power line voltage. Under these conditions, the expression for $I_{RMS\,(max)}$ is as follows:

$$I_{RMS\,(max)} = \frac{I_m}{\sqrt{2}}$$

Using this fact, the expression for the ratio $$\frac{I_{RMS}}{I_{RMS\,(max)}}$$

becomes:

$$\frac{I_{RMS}}{I_{RMS\,(max)}} = \sqrt{\frac{2}{\pi} \int_0^\gamma (\sin(\omega t + \lambda - \theta) - \sin(\lambda - \theta) e^{-\omega t \cot\theta})\, d(\omega t)} = \qquad (10)$$

$$\sqrt{\frac{2}{\pi}\left(\int_0^\gamma \sin^2(\omega t + \lambda - \theta)\, d(\omega t) - 2\sin(\lambda - \theta) \int_0^\gamma \sin(\omega t + \lambda - \theta) e^{-\omega t \cot\theta}\, d(\omega t) + \sin^2(\lambda - \theta) \int_0^\gamma e^{-2\omega t \cot\theta}\, d(\omega t)\right)}$$

For convenience, the three integral terms of equation (10) are integrated separately. These integrals are shown in equations (11), (12), and (13).

$$\int_0^\gamma \sin^2(\omega t + \lambda - \theta)\, d(\omega t) = \qquad (11)$$

$$\left[\frac{\omega t + \lambda - \theta}{2} - \frac{\sin 2(\omega t + \lambda - \theta)}{4}\right]_0^\gamma =$$

$$\frac{1}{2}\left(\frac{\gamma + \sin 2(\lambda - \theta)}{2} - \frac{\sin 2(\gamma + \lambda - \theta)}{4}\right) =$$

$$\frac{\gamma}{2} + \frac{\sin 2(\lambda - \theta)}{4} - \frac{\sin 2(\gamma + \lambda - \theta)}{4}$$

$$-2\sin(\lambda - \theta) \int_0^\gamma \sin(\omega t + \lambda - \theta) e^{-\omega t \cot\theta}\, d(\omega t) = \qquad (12)$$

$$-2\sin(\lambda - \theta) \sin^2\theta\, [e^{\omega t \cot\theta}(-\cot\theta \sin(\omega t + \lambda - \theta) \cos(\omega t + \lambda - \theta))]_0^\gamma =$$

$$-2\sin(\lambda - \theta) \sin^2\theta\, (e^{-\gamma \cot\theta}(-\cot\theta \sin(\gamma + \lambda - \theta) - \cos(\gamma + \lambda - \theta)) + \cot\theta \sin(\lambda - \theta) + \cos(\lambda - \theta) =$$

$$+2\sin(\lambda - \theta) \sin\theta\, (e^{-\gamma \cot\theta} \sin(\gamma + \lambda) + \sin\gamma)$$

$$\sin^2(\lambda - \theta) \int_0^\gamma e^{-2\omega t \cot\theta}\, d(\omega t) = \qquad (13)$$

$$\left[\frac{-\tan\theta}{2} \sin^2(\lambda - \theta) e^{-2\omega t \cot\theta}\right]_0^\gamma =$$

$$\frac{-\tan\theta}{2} \sin^2(\lambda - \theta)(e^{-2\gamma \cot\theta} - 1)$$

Substituting equations (11), (12), and (13) in equation (10) yields the result:

(14)

$$\frac{I_{RMS}}{I_{RMS\,(max)}} =$$

$$\left(\sqrt{\frac{2}{\pi}}\left(\frac{\gamma}{2} + \frac{\sin 2(\lambda - \theta)}{4} - \frac{\sin 2(\gamma + \lambda - \theta)}{4} + \right.\right.$$

$$\left. 2 \sin\theta \sin(\lambda - \theta)(\sin\gamma + \sin(\gamma + \lambda)) e^{-\gamma \cot\theta} \right) -$$

$$\left. \frac{\tan\theta}{2} \sin^2(\lambda - \theta)(e^{-2\gamma\cot\theta} - 1) \right) \bigg\}^{\frac{1}{2}}$$

Equation (14) relates firing angle, $\lambda$, natural power factor angle, $\theta$, total conduction angle, $\gamma$, and proportion of available RMS current for a particular power line voltage. Calculating the function $$\left( \frac{I_{RMS}}{I_{RMS\ (max)}} \right)^2$$

involves simply squaring equation (14).

Equations (7) and (14) are used in the following way. If the power factor of the welding structure 10 is not known the control will assume a power factor of 10 percent ($\theta = 84.26°$). This value of $\theta$ is substituted into equation (7) and equation (7) is solved for $\gamma$ (the value of t where $i=0$) in terms of $\lambda$, the firing angle. Substituting this into equation (14), equation (14) is solved for $\lambda$, the firing angle which corresponds to the desired value of $$\frac{I_{RMS}}{I_{RMS\ (max)}}.$$

The contactor is then fired for the next two half cycles at the computed firing angle, $\lambda$. Measurements of $\gamma$ are taken and equation (7) is used to compute a corrected value of $\theta$. For any succeeding cycles, this same process is done again, starting with the third sentence of this paragraph. (i.e. if $\theta$ is known, there is no need to take a guess at it).

This process allows the control to compute a firing angle which corresponds to a desired user set percent heat.

$$(\%\ \text{heat} = \left( \frac{I_{RMS}}{I_{RMS\ (max)}} \right)^2$$

for any value of power factor ($\theta$). Furthermore, it allows an accurate user percent heat setting to be implemented. That is, if the user wants the energy rate delivered to the weld to be say 50 percent of its maximum value, he need merely enter 50 percent and the control will take into account power factor to compute the proper firing angle. If the power factor shifts ($\theta$ changes) this is corrected for within 1 cycle, because the control re-computes $\theta$ on each and every cycle.

Once a stable and accurate control of percent heat, independent of any value of power factor, is achieved, the control can also do very effective power line voltage compensation. That is, it can eliminate the variations in welding current caused by power line voltage shifts.

In compensating for power line voltage shifts, a nominal value for the power line voltages is assumed. This value is the standard to which the actual power line voltage is compared. This nominal line voltage value may or may not be user settable.

For a given welding circuit, and firing angle, the energy, delivered to the welding circuit is a function of the power line voltage squared. That is, if the power line voltage changes from the nominal value, $V_1$, to a different value $V_2$, the energy delivered to the welding circuit will change by a factor K, equal to $(V_1/V_2)^2$.

Since equations (7) and (14) allow the control to implement an accurate percent heat setting, correcting for power line voltage changes consists simply of adjusting the value of the user percent heat setting by multiplying it by the factor $1/K$. That is, corrected heat setting = user percent heat setting $\times (V_2/V_1)^2$ where, $V_2$ = nominal line voltage, and $V_1$ = actual line voltage.

Constant current control of the welding current may also be implemented, using a slightly different method and reading the value of i (as in FIG. 2) instead of power line voltage. The method is as follows.

Initially, if the value of $\theta$ (power factor) is not known, the control fires the first two half-cycles of welding current at a fairly large value of $\lambda$, corresponding to a low power factor and low welding current.

Measurements of $\gamma$ and i are taken. Measurements of i are taken in such a way that the true RMS value, that is, $I_{RMS}$ as in equation (14) can be obtained. Substituting the known values of $\lambda$ and $\gamma$ into equation (7) allows the value of $\theta$ to be found. The known values of $\theta$, $\lambda$, $\gamma$ and $I_{RMS}$ (i measurement) are put into equation (14) and the value of $I_{RMS(max)}$ is determined. If this value of $I_{RMS}$ maximum is lower than the user set desired current value, the control will alert the operator to the fact that the current value entered is not attainable.

Assuming that $I_{RMS(max)}$ is more than the user set desired current value, the user-set desired current value is substituted for $I_{RMS}$ in equation (14) and the calculated $I_{RMS(max)}$ value is also put into equation (14). The known value of $\theta$ (power factor angle) is substituted into equation (7) and equation (7) is solved for $\gamma$ in terms of $\lambda$. This result is substituted into equation (14) so that equation (14) may be solved for $\lambda$, the new desired firing angle. This process repeats each cycle, skipping the initial step of taking a "guess" at the value of $\lambda$ if $\theta$ is known.

If both the power line voltage and the current i, in the circuit are measured, correction for changes in power factor of the welding circuit may be compensated for as well as changes in the power line voltage.

If both applied voltage, v as in FIG. 2 and resultant current $I_{RMS(max)}$ are known, the total impedance 2, of the circuit may be calculated using Ohm's law.

$$2 = \frac{v}{I_{RMS\ (max)}} = \sqrt{X_L^2 + R^2} \tag{15}$$

$X_L$ = Impedance of Inductor
R = Value of Resistance

As it has been shown, it is possible to determine the power factor of a circuit by measurement of $\lambda$ and as in equation (7). The ratio of R to L in the circuit is related to $\theta$, the natural power factor angle obtained from equation (7) by the relationship:

$$\theta = \tan^{-1} \frac{\omega L}{R}\ \omega = 2\pi F;\ F = \begin{array}{l} 60\ \text{Hz for a 60 Hz} \\ \text{Power Line} \end{array} \tag{16}$$

By using equation (15) and (16), the absolute values of R and L can be found. With this information, a host of possibilities arises.

One possibility is to maintain constant energy flow delivered to the resistive portion of the circuit, regardless of changes in R, L or applied line voltage, v.

Another possibility is to determine whether or not the welding machine is working properly. Since the values of R and L can be measured, these can be compared to known good values and any change detected.

Figure 6:
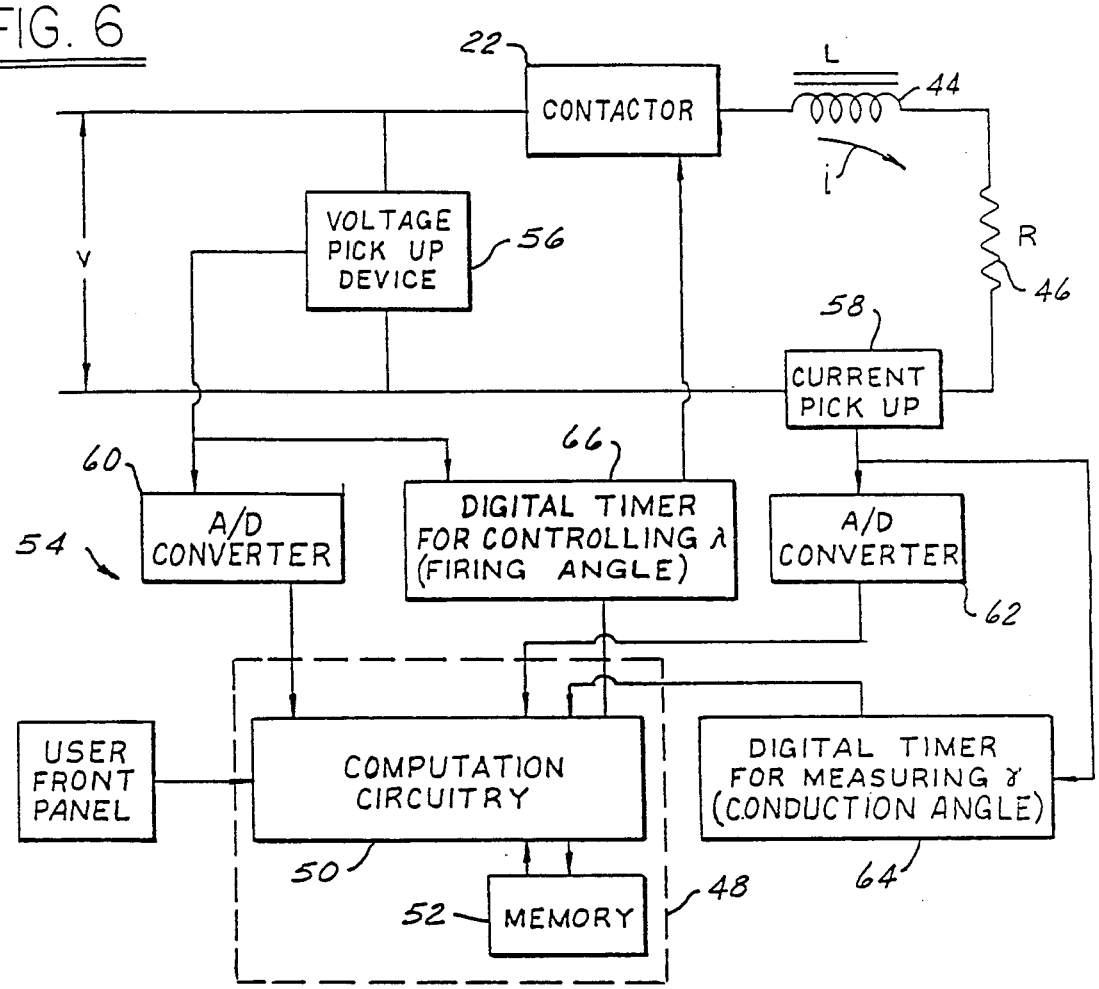
FIG. 6 is a block diagram of welding control structure constructed in accordance with the invention for practicing the method of the invention, connected to a resistance welding circuit such as illustrated in FIG. 1.

The electronic circuitry needed to implement the control method described mathematically is shown in FIG. 6.

The computation circuitry takes the digitized values of $\gamma$, v and i (optional) and the user entered values and performs the operations previously described. The output of these computations, is a digital number outputted to control $\lambda$, via a digital timer triggered from the power line voltage zero crossings. This timer then outputs a pulse or strings of pulses when the time represented by the preload number has elapsed.

The timer for measuring $\gamma$ is triggered on by the flow of current i, in the circuit. The timer stops when i=0. A digital value representing the time duration that current flowed is then available at the timer output.

The computation circuitry could be built up of discrete digital logic, analog components or any type of programmable computer within the skill of the electronic control art.

In the present implementation the computation circuitry 48 consists of a Z-80 microcomputer 50 and an appropriate memory 52 to hold the needed program and all the intermediate results of the calculations.

The control 54 for practicing the method of the invention as shown in FIG. 6 besides the computation circuitry 48 includes a voltage pick up device 56, current pick up device 58 and analog to digital converters 60 and 62 connected between devices 56 and 58 and the computation circuitry respectively.

A digital timer 64 is also connected between the current pick up device 58 and the computation circuitry 48 for measuring the conduction angle ($\gamma$).

A second digital timer 66 is connected between computation circuitry 48 and the contactor 22 in welding circuit 10 and to the voltage pick-up device 56. Digital timer 66 functions to provide firing pulses for contactor 22 a predetermined time after a voltage zero voltage cross over in accordance with a signal received from the computation circuitry 48.

The user front panel 68 is connected to the computation circuit 48 permits user setting of percent heat or primary current desired in accordance with the above discussion.

In the preferred implementation, the equations (7) and (14) are not calculated directly. Rather, they are approximated very closely by three relatively simple structures. This is done for reasons of speed. The calculations need to be done in approximately 1/100th of a second. A computer system capable of doing the calculations this fast would be prohibitively expensive and approach the upper limit of presently available larger computer capabilities. In the future, as more and more computer power becomes available at very low prices, it is anticipated that all the calculations will be done exactly with no approximating equations needed.

At present, however, the approximation equations for equation (7) are described below. These are the equations used to compute power factor for a given firing angle, and the resultant conduction angle, $\gamma$.

The first part computes a constant, labeled D, which is related to the firing angle, $\lambda$. A 9-element array labeled A, containing 8-bit binary values contains the following numbers:

| A(0) = 255 | A(1) = 247 | A(2) = 234 | A(3) = 220 |
|---|---|---|---|
| A(4) = 201 | A(5) = 176 | A(6) = 146 | A(7) = 113 |
| A(8) = 76 | | | |

The variable x represents the firing angle $\lambda$, x is scaled so that 8,192 equals $\frac{1}{2}$ cycle (8$\frac{1}{3}$ ms) of the 60 Hz power line.

Figure 7:
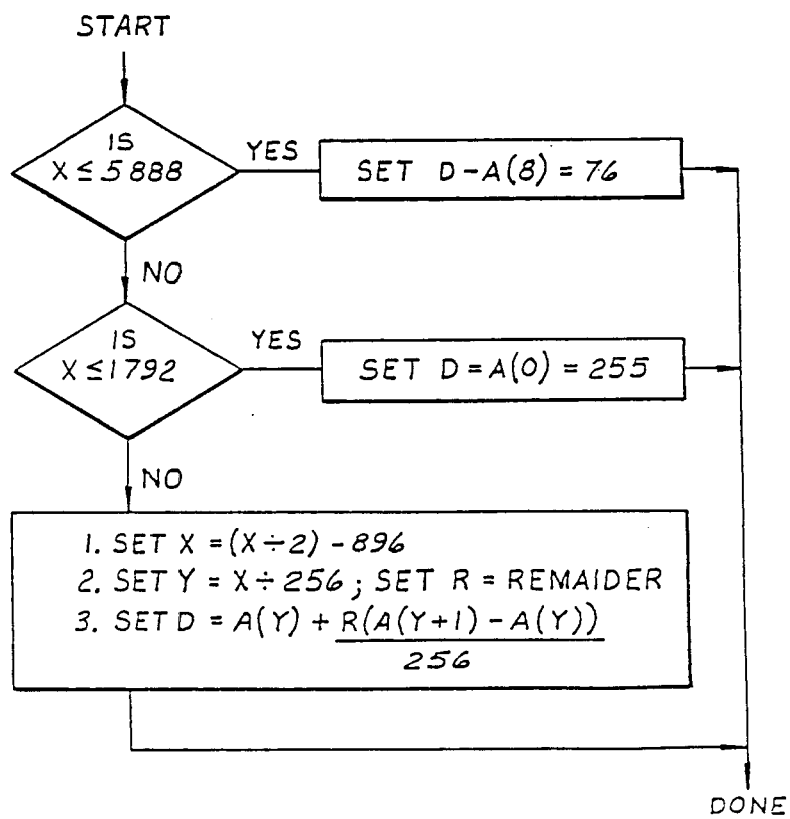
FIGS. 7 and 8 are flow charts useful in explaining the invention.

D is computed utilizing the algorithm expressed in the flow chart of FIG. 7. A basic program listing for the flow chart of FIG. 7 is provided below.

```
10  Dimension A(8)
20  Let A(0) = 255
30  Let A(1) = 247
40  Let A(2) = 234
50  Let A(3) = 220
60  Let A(4) = 201
70  Let A(5) = 176
80  Let A(6) = 146
90  Let A(7) = 113
100 Let A(8) = 76
110 If x ≧ 5887 then go to 200
120 If x ≦ 1793 then go to 250
130 Let x = (x/2) − 896
140 Let x = x/256
150 Let R = X − (256 * y)
160 Let D = A(y) + R * (A (y + 1) − A(y)/256
170 Return
200 Let D = A(8)
210 Return
250 Let D = A(0)
260 Return
```

Figure 8:
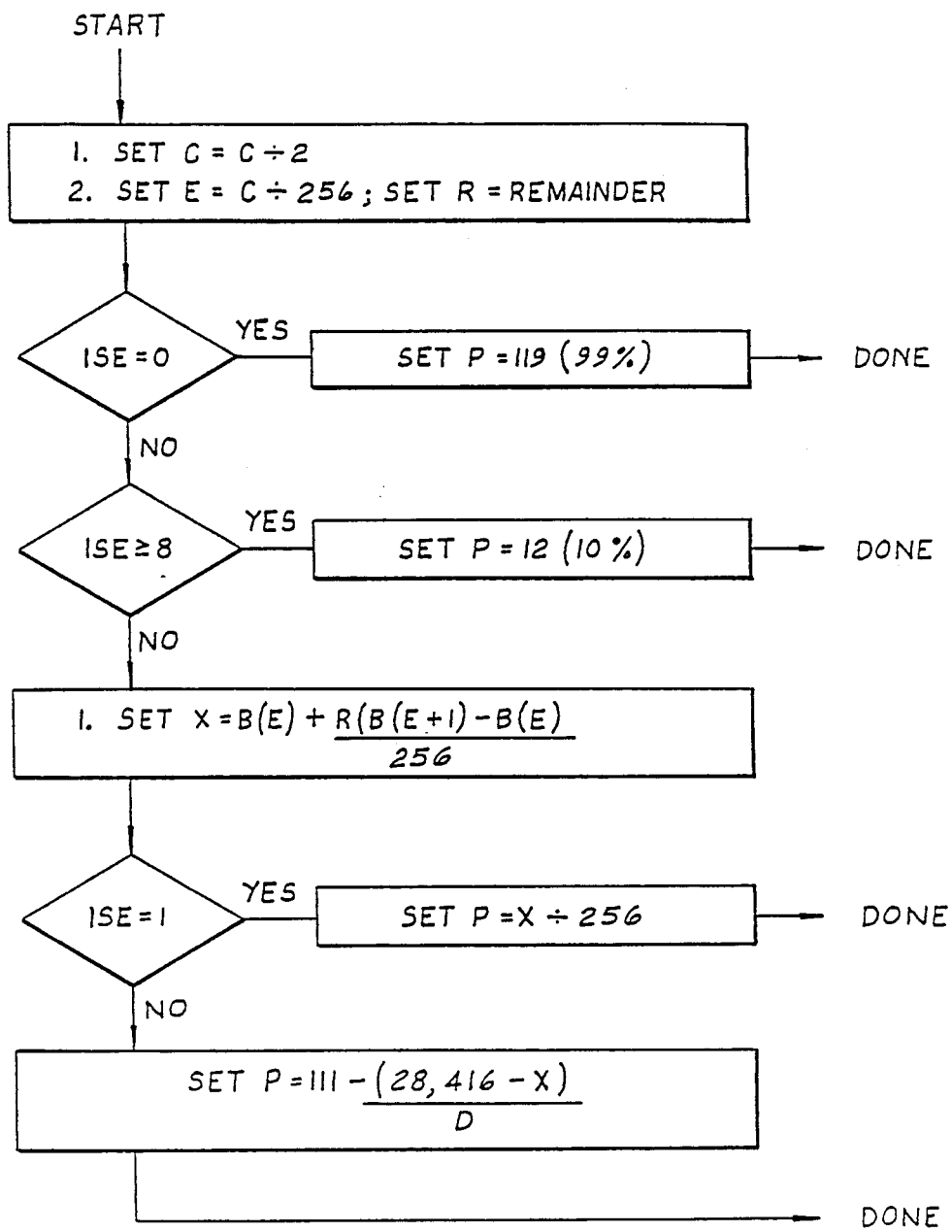

The second part uses the just computed variable, D, plus the amount of time that current flows past the voltage zero crossing ($\gamma - t_1$, in FIG. 3), C, to compute the power factor. C is scaled so that 8,192 equals $\frac{1}{2}$ cycle (8$\frac{1}{3}$ ms) of the 60 Hz power line. C is related to $\gamma$, the total conduction angle by the equation C=2,607.5946 ($\lambda+\gamma-\pi$) where $\lambda$ and $\gamma$ are expressed in radians C is defined in this way to simplify and speed calculations associated with this part of the calculation. The computation of the power factor uses an 8 element array, labeled B which contains the following 16 bit binary numbers:

| B(1) = 30,120 | B(2) = 28,367 | B(3) = 25,517 |
|---|---|---|
| B(4) = 21,822 | B(5) = 17,650 | B(6) = 13,686 |
| B(7) = 10,127 | B(8) = 7,144 | | the other variables used are:
P=1.2 times % power factor (the 1.2 scaling factor improves resolution).
D=firing angle correction factor (previously discussed)
Q=256 times P (256P)
R=VARIABLE
C=2,607.5946 ($\lambda+\gamma-\pi$)=conduction past zero crossing
E=VARIABLE See FIG. 8 for the algorithm for determining P. A basic program listing for the flow chart illustrated in FIG. 8 is provided below.

```
10 Dimension B(8)
20 Let B(1) = 30,120
30 Let B(2) = 28,367
40 Let B(3) = 25,517
50 Let B(4) = 21,822
60 Let B(5) = 17,650
70 Let B(6) = 13,686
80 Let B(7) = 10,127
90 Let B(8) = 7,144
100 Input C
110 Let C = C/2
120 Let E = C/256
130 Let R = C * 256 - E
140 If E = 0 then go to 200
150 If E ≧ 8 then go to 250
160 Let X = B(E) + R(B (E + 1) - B(E))/256
170 If E = 1 then go to 300
180 Let P = 111 - ((28416 - X) /D)
190 Return
200 Let P = 119
210 Return
250 Let P = 12
260 Return
300 P = X/256
310 Return
```

The resulting number, P, is then used to compute the firing angle in response to a user-set-percent heat or primary current value.

The method uses an equation of the form:

$$F = A - BX - CY + DZ$$

where X, Y, and Z are assigned values according to the following rules:

1.

X = (% heat −70) or zero whichever is greater

2.

(a) If X=0, Y=(% heat −30) or zero whichever is greater
(b) If X≠0, Y=40

3.

(a) If Y=0, Z=% Heat
(b) If Y≠0, Z=30

The coefficients A, B, C, and D are fetched from the table shown below. For each value of P, there is a set of A, B, C, and D coefficients. The table lists only every other value of P (only the even values). Interpolation is used when P is an odd value.

| P | A | B | C | D |
|---|------|----|----|----|
| 12 | 6053 | 14 | 18 | 36 |
| 14 | 6045 | 14 | 18 | 36 |
| 16 | 6038 | 15 | 19 | 37 |
| 18 | 6030 | 15 | 19 | 37 |
| 20 | 6023 | 15 | 19 | 38 |
| 22 | 6015 | 16 | 20 | 38 |
| 24 | 6008 | 16 | 20 | 39 |
| 26 | 6000 | 16 | 21 | 39 |
| 28 | 5992 | 17 | 21 | 39 |
| 30 | 5985 | 17 | 22 | 40 |
| 32 | 5977 | 17 | 22 | 40 |
| 34 | 5970 | 18 | 23 | 40 |
| 36 | 5962 | 18 | 23 | 41 |
| 38 | 5951 | 18 | 23 | 41 |
| 40 | 5939 | 19 | 24 | 41 |
| 42 | 5928 | 19 | 24 | 41 |
| 44 | 5916 | 20 | 24 | 41 |
| 46 | 5905 | 20 | 25 | 41 |
| 48 | 5894 | 21 | 25 | 42 |
| 50 | 5882 | 21 | 25 | 42 |
| 52 | 5871 | 22 | 26 | 42 |
| 54 | 5859 | 22 | 26 | 42 |
| 56 | 5848 | 23 | 26 | 42 |
| 58 | 5836 | 23 | 27 | 42 |
| 60 | 5825 | 24 | 27 | 42 |
| 62 | 5833 | 25 | 28 | 43 |
| 64 | 5840 | 26 | 28 | 43 |
| 66 | 5848 | 26 | 29 | 44 |
| 68 | 5855 | 27 | 29 | 45 |
| 70 | 5863 | 28 | 30 | 45 |
| 72 | 5871 | 29 | 31 | 46 |
| 74 | 5878 | 29 | 31 | 47 |
| 76 | 5886 | 30 | 32 | 47 |
| 78 | 5893 | 31 | 32 | 48 |
| 80 | 5901 | 32 | 33 | 49 |
| 82 | 5908 | 33 | 33 | 49 |
| 84 | 5916 | 33 | 34 | 50 |
| 86 | 5927 | 35 | 34 | 50 |
| 88 | 5939 | 36 | 35 | 51 |
| 90 | 5950 | 38 | 35 | 51 |
| 92 | 5962 | 40 | 36 | 51 |
| 94 | 5973 | 41 | 36 | 52 |
| 96 | 5985 | 43 | 37 | 52 |
| 98 | 5996 | 45 | 37 | 52 |
| 100 | 6007 | 46 | 38 | 53 |
| 102 | 6019 | 48 | 38 | 53 |
| 104 | 6030 | 50 | 39 | 53 |
| 106 | 6042 | 51 | 39 | 54 |
| 108 | 6053 | 53 | 40 | 54 |
| 110 | 6098 | 58 | 40 | 52 |
| 112 | 6144 | 63 | 41 | 50 |
| 114 | 6189 | 67 | 41 | 48 |
| 116 | 6235 | 72 | 42 | 46 |
| 118 | 6280 | 77 | 43 | 44 |

F, the result, is the firing angle λ, expressed as a binary number scaled so that 8,192 equals 180° ($\pi$ radians or 8⅓ milliseconds).

If the user-entered value is in terms of current rather than percent heat, the same table and equation is used, but with a slightly different method.

If the values of $I_{RMS(max)}$ (as in equation 14) or P (power factor) are not known, the first cycle of the weld is fired at a large value of F, corresponding to a low current with a low power factor. Measurements of i and γ (conduction angle) are taken and the power factor value P, is determined. Using this value of P to find the correct A, B, C, D coefficients and using the value of F that was used, the values of X, Y, and Z are determined. From these values, the effective percent heat can be found using the rules set forth above, backwards.

The value of $I_{RMS(max)}$ can be computed using the simple relationship:

$$I_{RMS(max)} = I_{RMS\,(measured)} \times \frac{1}{\sqrt{\%\ \text{Heat}}}$$

Since $\left(\dfrac{I_{RMS}}{I_{RMS(max)}}\right)^2$ = percent heat.

That is, the energy delivered to the resistive part of an L-C series circuit is equal to $i^2R$.

The firing point for the next cycle is computed by calculating a percent heat setting from the relationship and going through the calculations as previously described.

$$\% \text{ Heat} = \left( \frac{I_{RMS\,(user\text{-}set)}}{I_{RMS\,(max)}} \right)^2$$

Power line voltage compensation is implemented inherently in the user-set current mode. $I_{RMS(max)}$ is re-calculated each cycle, using the measured values of i and $\gamma$. Since the measured value of i will shift in direct proportion to power line voltage changes, so will the value of $I_{RMS(max)}$ and the percent heat value calculated from it will change so as to compensate for the change in power line voltage.

Thus, with the welding control of the invention, changes in the power factor of the welding circuit of the welding structure 10 may be compensated for. It is not unusual to observe five percent power factor variations in a resistance welder due to the positioning of the part or the automation holding the part in the magnetic field around the secondary circuit of the welder. Parts being welded and/or the automation handling them are most often ferrous metals, which when placed in the magnetic field of the welder secondary circuit, tend to increase the effective inductance of the circuit. When the inductance increases, the ratio of resistance to inductance, and thus the power factor, is reduced. Increased inductance causing a change in power factor will cause a reduction of power delivered to the resistive portion of the circuit which is primarily the welds, in an amount proportional to the square of the power factor, change. If, however, the control is constantly measuring firing angle delay and conduction angle past zero crossing, and using this information to compute power factor, then it is possible to correct for power factor variations as well as line voltage variations in order to eliminate any effect they might have on the energy flow delivered to the weld, In summary, the welding control structure 50 and method of the invention can maintain a constant energy at the weld, independent of the power factor and power line variations. The conduction angle of the contacter, or the agle difference between the line current and line voltage, together with the firing delay angle are used to measure the ratio of inductance to resistance in the welder circuit. This information is used to select the correct function of the relationship between firing angle delay and energy flow so that a percentage-wise linear heat control is provided.

The structure and method of the invention then uses this percentage-wise linear heat control to simply the correction for power line voltage variations.

While one embodiment of the present invention has been disclosed in detail herein, it will be understood that other embodiments and modifications thereof are contemplated by the inventor. It is the intention to include all such embodiments and modifications thereof are contemplated by the inventor. For example the discussion involving an inductive reactance, non unity power factor load could instead use a capacitive reactance which is also a non unity power factor load within the scope of the invention. It is the invention to include all such embodiments and modifications as are defined by the appended claims within the scope of the invention.

I claim:

1. For use with an alternating current electrical circuit which includes a reactance and a varying resistance, a method of determining the power factor of said circuit following the application to said circuit of a source of alternating current voltage, comprising the steps of:
   (A) determining the time interval $t_1$ between the application of said voltage to said circuit and the following zero crossover point of said voltage;
   (B) determining the time interval $t_2$ between said zero crossover point of said voltage and the following zero point of the current flowing in said circuit which results from the application of said voltage to said circuit; and
   (C) determining the value of said power factor based on the time intervals $t_1$ and $t_2$ determined in steps (A) and (B).

2. The method of claim 1, including the steps of:
   (D) sensing changes in the value of said alternating current voltage; and
   (E) adjusting the time interval $t_1$ based on the changes sensed in step (D) and the power factor determined in step (C).

3. For use with a phase controlling device for an alternating current circuit, a method of determining the power factor of said circuit, comprising the steps of:
   (A) measuring the time interval $t_1$ between ignition of a contactor for applying an a.c. voltage to a load and the subsequent zero crossover point of said a.c. voltage;
   (B) measuring the time interval $t_2$ between said crossover point of said a.c. voltage and the extinction of current flow to said load produced by said applied a.c. voltage; and,
   (C) calculating said power factor based on the time intervals $t_1$ and $t_2$ measured in steps (A) and (B).

4. The method of claim 3, including the steps of:
   (D) selecting the ignition angle of said contactor, based on the power factor calculated in step (C), thereby to reduce the applied a.c. voltage to a preselected level which is a portion of the maximum available value of said a.c. voltage.

5. The method of claim 4, including the steps of:
   (E) sensing the value of said maximum available a.c. voltage;
   (F) preselecting a desired level of a.c. voltage to be applied to said load; and,
   (G) generating an error signal when said maximum available a.c. voltage falls below said desired level.

6. The method of claim 3, including the step of displaying the value of the power factor calculated in step (C).

7. The method of claim 3, including the steps of:
   (D) preselecting a power factor value;
   (E) comparing the power factor value preselected in step (D) with the value of the power factor calculated in step (C); and,
   (F) generating a fault signal when the value of the power factor calculated in step (C) is in a prescribed relationship to the power factor value preselected in step (D).

8. The method of claim 3, wherein:
   step (A) is performed by sensing the value of said a.c. voltage, and
   step (B) is performed by sensing the value of said current flow.

9. The method of claim 8, including the step of:
   (D) determining the resistive and reactive portions of the impedance of said load using the sensed values of voltage and current flow and the power factor calculated in step (C).

10. The method of claim 9, including the step of displaying the values of said resistive and reactive portions of said impedance.

11. The method of claim 9, including the steps of:
comparing the value of the resistive portion of said impedance determined in step (D) with a preselected value; and,
generating a fault signal when the value of said resistive portion of said impedance is in a preselected relationship to said preselected value.

12. The method of claim 9, including the steps of:
comparing the value of the reactive portion of said impedance determined in step (D) with a preselected value; and
generating a fault signal when the value of said reactive portion of said impedance is in a preselected relationship to said preselected value.

13. The method of claim 3, including the step of:
(D) selecting the ignition angle of said contactor, based on the power factor calculated in step (C), thereby to reduce the flow of electrical energy through said load to a preselected value which is a portion of the maximum available value of electrical energy.

14. The method of claim 3, including the step of:
(D) selecting the ignition angle of said contactor, based on the power factor calculated in step (C), thereby to reduce the flow of current to said load to a preselected level which is lower than the maximum possible current flow.

15. The method of claim 3, including the steps of:
(D) preselecting a desired level of current to flow through said load; and,
(E) using the power factor calculated in step (C) and the current level preselected in step (D) to generate an error signal when said preselected current level cannot be achieved because there exists no ignition angle which will effect flow of said preselected level of current.

16. The method of claim 3, including the steps of:
(D) sensing the value of the maximum available a.c. voltage;
(E) sensing the value of the current flowing through said load; and
(F) using the power factor calculated in step (C) and the values of voltage and current sensed respectively in steps (D) and (E) to select an ignition angle of said contactor to control the flow of electrical energy through said load to a preselected value thereof.

17. The method of claim 16, including the step of generating an indication of the value of the flow of electrical energy controlled in step (F).

18. For use in a phase controlling device for an alternating current electrical circuit, apparatus for measuring the power factor of said circuit, comprising:
means for measuring the time interval $t_1$ between ignition of a contactor for applying an a.c. voltage to a load and the subsequent zero crossover point of said a.c. voltage;
means for measuring the time interval $t_2$ between said zero crossover point of said a.c. voltage and the extinction of current flow to said load produced by said applied a.c. voltage; and,
means for calculating said power factor based on the time intervals $t_1$ and $t_2$.

19. The apparatus of claim 18, including means for selecting the ignition angle of said contactor, based on the calculated power factor, in order to reduce the applied a.c. voltage to a preselected level which is a portion of the maximum available value of said a.c. voltage.

20. The apparatus of claim 19, including means fior sensing the value of said maximum available a.c. voltage, means for preselecting a desired level of a.c. voltage to be applied to said load and means for generating an error signal when the maximum available a.c. voltage falls below said desired level.

21. The apparatus of claim 18, including means for displaying the value of the power factor calculated by said calculating means.

22. The apparatus of claim 18, including means for preselecting a power factor value, means for comparing the preselected power factor value with the value of the power factor calculated by said calculating means, and means for generating a fault signal when the value of the power factor calculated by said calculating means is in a prescribed relationship to the preselected power factor value.

23. The apparatus of claim 18, including:
means for sensing the value of sid a.c. voltage;
means for sensing the value of said current flow; and,
means for determining the resistive and reactive portions of the impedance of said load using the sensed values of voltage and current and the power factor calculated by said calculating means.

24. The apparatus of claim 23, including means for displaying the values of said resistive and reactive portions of said impedance.

25. The apparatus of claim 23, including:
means for comparing the value of the resistive portion of said impedance with a preselected value; and,
means for generating a fault signal when the value of said resistive portion of said impedance is in a preselected relationship to said preselected value.

26. The apparatus of claim 23, including:
means for comparing the value of the reactive portion of said impedance with a preselected value; and,
means for generating a fault signal when the value of said reactive portion of said impedance is in a preselected relationship to said preselected value.

27. A control for generating firing point signals for phase controlled firing of a contactor in the circuit of a non-unity power factor load having at least one of a preselected percent heat and current through the load, comprising: means for providing continuous firing point corrections to maintain one of the preselected percent heat and current through said load, including means for sensing voltage in said circuit, means for sensing the current in said circuit, means connected to said means for sensing the voltage and current in said circuit for determining the power factor of said circuit and means connected to said means for determining said power factor of said circuit responsive to the circuit power factir and one of the preselected percent heat and current through the load for providing the continuous firing point corrections, said means for determining said power factor of said circuit including means for determining the time interval $t_1$ between the time of turn on of said contactor in said circuit and the following zero crossover voltage in said circuit, means for determining the time interval $t_2$ from the turn on of said contactor to the following zero current point, and means for producing said circuit power factor from said time intervals $t_1$ and $t_2$.

28. The control of claim 27, wherein said circuit includes the primary circuit of a welding transformer.

29. The control of claim 27, wherein said means for sensing the voltage and current includes means for measuring and comparing the firing angle delay of said cintactor and the current conduction after zero voltage crossover in said contactor.

30. A method for generating firing point signals for phase controlled firing of a contactor in the circuit of a non-unity power factor load having at least one of a preselected percent heat and current through the load, comprising: providing continuous firing point corrections to maintain one of the preselected percent heat and current through said load including the steps of sensing the voltage in said circuit, sensing the current in said circuit, depriving the circuit power factoor from the sensed current and voltage, deriving continuous firing point corrections from said circuit power factor and the one of the preselected percent heat and current through said load, determining the time between the time of turn on of said contactor in said circuit and the following zero crossover voltage in said circuit, determining the time from the turn on of said contactor to the following zero current point and deriving the circuit power factor from the determined time parameters.

31. The method of claim 30, wherein the steps of sensing the voltage and current include measuring and comparing the firing angle delay of said contactor and the current conduction after zero voltage crossover in said contactor to determine the actual power factor of said circuit in operation to enable control to be effected in accordance with the actual power factor of said circuit.

* * * * *

UNITED STATES PATENT AND TRADEMARK OFFICE
CERTIFICATE OF CORRECTION

PATENT NO. : 4,851,635
DATED : July 25, 1989
INVENTOR(S) : John F. Farrow

It is certified that error appears in the above-identified patent and that said Letters Patent is hereby corrected as shown below:

Claim 20, line 1, change "fior" to --for--.

Claim 23, line 2, change "sid" to --said--.

Claim 29, line 4, change "cintactor" to --contactor--.

Claim 30, line 9, change "factoor" to --factor--.

Signed and Sealed this

Eighth Day of May, 1990

Attest:

HARRY F. MANBECK, JR.

Attesting Officer

Commissioner of Patents and Trademarks